(12) United States Patent
Yokota

(10) Patent No.: US 6,839,090 B1
(45) Date of Patent: Jan. 4, 2005

(54) VIDEO REPRODUCTION APPARATUS

(75) Inventor: Shigeru Yokota, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 874 days.

(21) Appl. No.: 09/621,735

(22) Filed: Jul. 21, 2000

(30) Foreign Application Priority Data

Jul. 27, 1999 (JP) .......... P 11-211619

(51) Int. Cl.[7] .......... H04N 11/00
(52) U.S. Cl. .......... 348/460; 386/94; 725/26; 725/27; 725/28; 725/29; 725/30; 725/31
(58) Field of Search .......... 725/25–31; 348/460; 386/94

(56) References Cited

U.S. PATENT DOCUMENTS 5,995,160 A * 11/1999 Rumreich .......... 348/564
6,020,882 A * 2/2000 Kinghorn et al. .......... 345/716
6,286,141 B1 * 9/2001 Browne et al. .......... 725/39
2002/0016962 A1 * 2/2002 Decarmo .......... 725/28

FOREIGN PATENT DOCUMENTS

JP 63-125483 8/1998

* cited by examiner

Primary Examiner—Thai Tran
Assistant Examiner—Alicia M Duggins
(74) Attorney, Agent, or Firm—Crowell & Moring LLP

(57) ABSTRACT

A video reproduction apparatus includes a video player 3 which reproduces a video signal, a V-chip signal for restricting a display of a specific image being added to the video signal; a video processing circuit 5 which processes the video signal from the video player 3; a CRT 7 which displays the video signal that is processed by the video processing circuit 5; a control section 10 which reads out the V-chip signal and judges whether a screen is to be blocked or not; and a memory 11 which stores a result of the judgment. When a mode is transferred to a special play mode, a judgment result which immediately precedes the mode transfer is read out from the memory 11. If the judgment result is that the blocking is to be blocked, the screen of the CRT 7 is set to a blocked state.

9 Claims, 4 Drawing Sheets

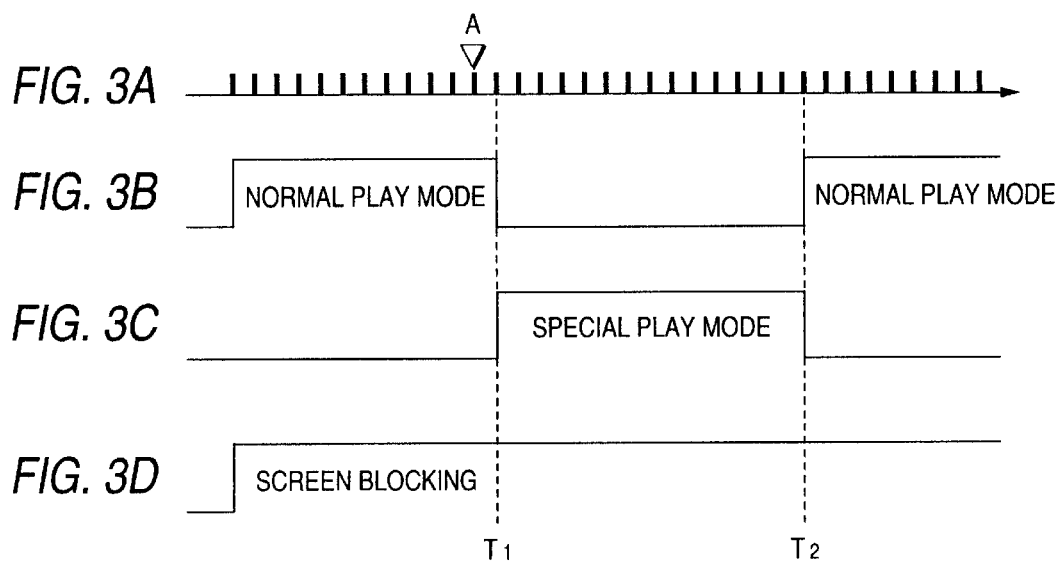
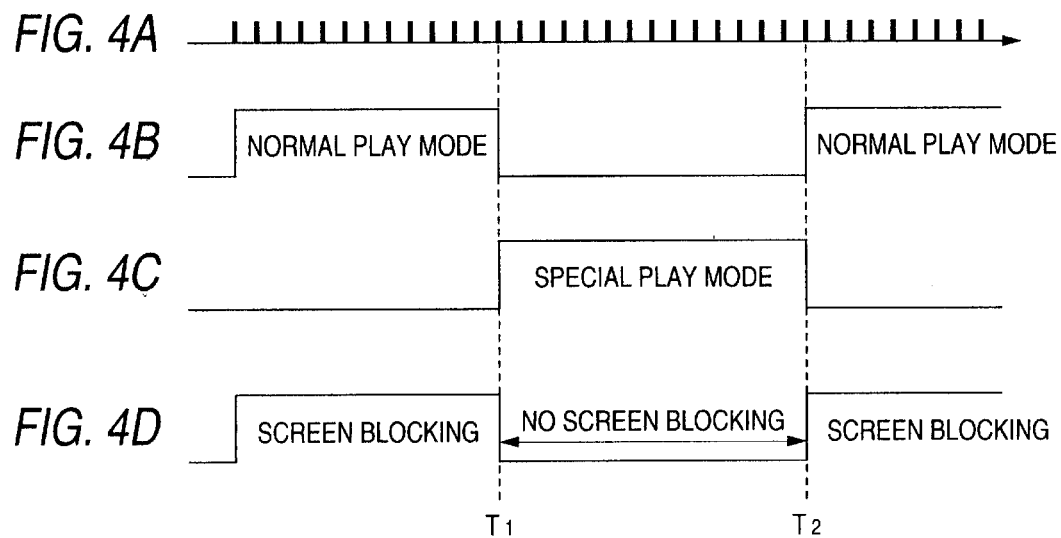

VIDEO REPRODUCTION APPARATUS

BACKGROUND OF THE INVENTION

1. Field of the Invention

The present invention relates to a video reproduction apparatus such as a TV/VCR combination, and more particularly to a video reproduction apparatus having a function of blocking a specific image.

2. Description of the Related Art

In the case where a video is reproduced from a recording medium such as a video tape by using a video reproduction apparatus, when the video includes a violent or sexual scene, minors are undesirably affected by the video. Therefore, a technique for blocking a display of such a scene on a screen has been conventionally employed.

For example, JP-A-63-125483U discloses a CATV system in which program contents are ranked according to a viewing allowance level, and a viewing of a program (such as an adult movie) of a rank which is higher than a registered rank is inhibited. In the system disclosed in the publication, however, the object which is to be blocked from being viewed is the whole of a program, and it is therefore impossible to block only a violent or sexual scene in each program.

By contrast, a method is employed in which, as shown in FIG. 5, a signal that is called a V-chip signal and used for restricting a display of a specific image is added into a vertical blanking interval of a video signal, and a video reproduction apparatus decodes the V-chip signal, thereby inhibiting a display of an image of the corresponding portion. The blocking of an image by using such a V-chip signal has been legislated in the U.S.A., and practically used. According to this method, when the code of a V-chip signal is selectively set by the user, a scene which is required not to be displayed can be blocked.

However, the blocking system which uses such a V-chip signal signal has a problem in that, when a video is reproduced in a special play mode, the blocking cannot be performed. Such a special play mode includes a slow play mode, a pause mode, and a search mode. When reproduction is performed in a slow play mode, for example, the waveform of a reproduced video signal is different from that of a video signal which is reproduced in a normal mode, and is disturbed. Therefore, the V-chip signal which is added to the video signal cannot be read as a normal signal, with the result that the blocking cannot function.

This problem will be specifically described with reference to FIGS. 4A to 4D. In the FIG., FIG. 4A shows a V-chip signal. In a normal play mode shown in FIG. 4B, the V-chip signal is correctly read, and the screen blocking is normally performed as shown in FIG. 4D. When the normal play mode is transferred to a special play mode at a time $T_1$ as shown in FIG. 4C, the V-chip signal is not correctly read. As shown in FIG. 4D, therefore, a state (between $T_1$ to $T_2$) in which the blocking is not performed on the screen occurs until the mode is returned at a time $T_2$ to the normal play mode.

As a result, the blocking can be intentionally disabled by performing reproduction in a special play mode, and hence the original object of a V-chip signal that a display of a violent or sexual scene is inhibited cannot be attained.

SUMMARY OF THE INVENTION

It is an object of the invention to provide a video reproduction apparatus which can solve the above-discussed problem, and in which, even when reproduction is performed in a special play mode, a screen can be surely blocked.

In order to attain the object, the video reproduction apparatus according to the invention is configured so that the apparatus reads a V-chip signal which is added to a video signal and which is used for restricting a display of a specific image; judges whether a screen is to be blocked or not; stores a result of the judgment into a memory; when a mode is transferred to a special play mode, reads out a judgment result which immediately precedes the transfer to the mode, from the memory; and performs a blocking process in accordance with the judgment result.

According to this configuration, in the case where the state immediately before the transfer to a special play mode is set so as to perform the blocking, the blocked state is maintained even after the mode is transferred to the special play mode. Therefore, the blocking cannot be intentionally disabled by an operation of reproduction in a special play mode, so that the blocking operation can be surely performed.

The invention can be realized as a video reproduction apparatus wherein the apparatus comprises: a video player which reproduces a video signal, a V-chip signal for restricting a display of a specific image being added to the video signal; a video processing circuit which processes the video signal from the video player; a display device which displays the video signal that is processed by the video processing circuit; a control section which reads out the V-chip signal and judges whether a screen is to be blocked or not; and a memory which stores a result of the judgment.

Alternatively, the apparatus may be configured so that a code of a V-chip signal to be used for blocking is preset in a memory, and, if a code of the read V-chip signal coincides with the code that is preset in the memory, it is judged that the screen is to be blocked, and, if the code of the read V-chip signal does not coincide with the code that is preset in the memory, it is judged that the screen is not to be blocked.

BRIEF DESCRIPTION OF THE DRAWINGS

FIGS. 3A to 3D are time charts showing the operation of the screen blocking in the invention;

FIGS. 4A to 4D are time charts showing the operation of the screen blocking in the conventional art.

DETAILED DESCRIPTION OF THE PREFERRED EMBODIMENTS

Hereinafter, an embodiment of the invention will be described with reference to the figures.

Figure 1:
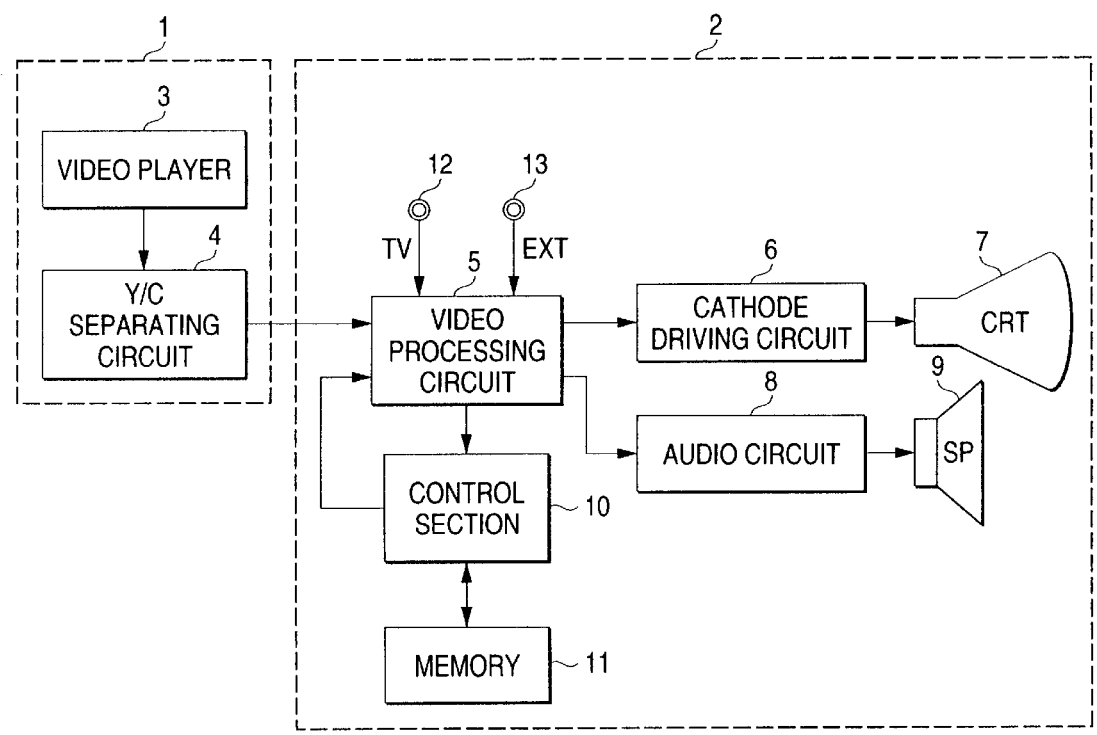
FIG. 1 is a block diagram showing the electrical configuration of a TV/VCR combination according to an embodiment of the invention.

FIG. 1 is a block diagram showing the electrical configuration of a TV/VCR combination according to an embodiment of the invention. In the FIG., reference numeral 1 denotes a VCR block, and 2 denotes a TV block. These blocks are integrally disposed in a television receiver.

Figure 5:
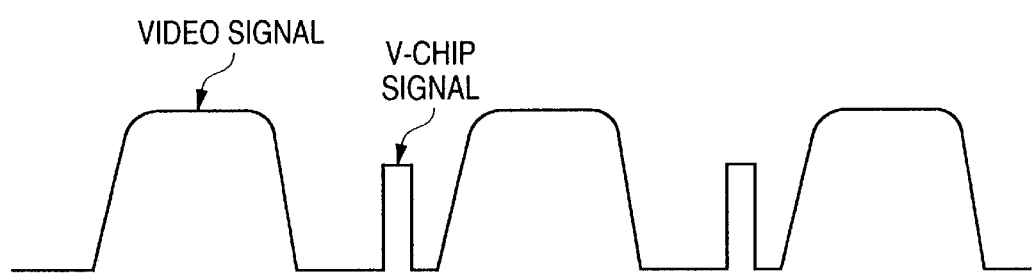
FIG. 5 is a waveform chart of a video signal to which a V-chip signal is added.

The VCR block 1 includes a video player 3 and a Y/C separating circuit 4. The video player 3 reads and reproduces a video signal which is recorded on a loaded video tape (not shown). A video signal which is similar to that shown in FIG. 5 is recorded on the video tape. The Y/C separating circuit 4 separates a luminance signal Y and a chrominance signal C from the video signal which is reproduced by the video player 3.

The TV block 2 includes a video processing circuit 5, a cathode driving circuit 6, a cathode ray tube (hereinafter, abbreviated to CRT) 7, an audio circuit 8, a loudspeaker 9, a control section 10, and a memory 11. A TV signal terminal 12 and an external input terminal 13 are connected to the video processing circuit 5.

The video processing circuit 5 processes the luminance signal Y and the chrominance signal C which are separated by the Y/C separating circuit 4, to produce output signals of R (red), G (green), and B (blue). The cathode driving circuit 6 supplies the output signals of R, G, and B to the cathode of the CRT 7 so that electron beams are emitted from the cathode. The CRT 7 is a display device in which phosphors of the screen are caused to emit light by the electron beams, whereby the original video signal is displayed as an image. The audio circuit 8 processes an audio signal which is separated by the video processing circuit 5, and supplies the processed audio signal to the loudspeaker 9.

The control section 10 is configured by a microcomputer, and performs a control for a screen blocking based on a V-chip signal which will be described later, on the video processing circuit 5. Programs for operating the control section 10, and a code of the V-chip signal which is used for the blocking are previously stored in the memory 11. The code can be freely set by the user.

A TV signal is input from an antenna which is not shown, into the TV signal terminal 12 via a tuner. An external apparatus such as a desktop VTR (Video Tape Recorder) or a DVD (Digital Video Disk) player is connected to the external input terminal 13.

Figure 2:
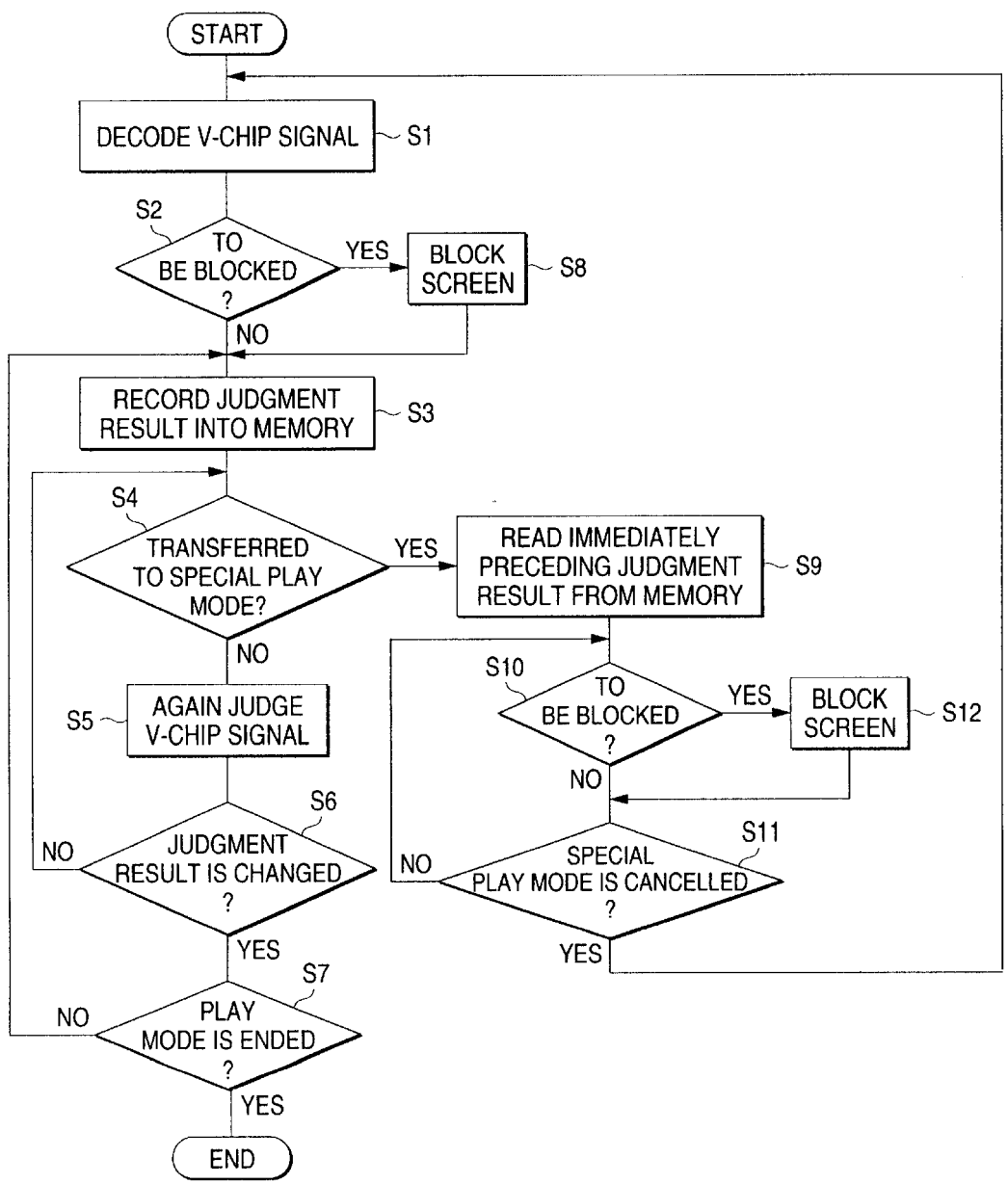
FIG. 2 is a flowchart showing the operation of the screen blocking in the invention.

FIG. 2 is a flowchart showing the operation of the screen blocking in the apparatus of FIG. 1, and illustrates the procedure which is implemented by the control section 10.

FIGS. 3A to 3D are time charts showing the operation of the screen blocking. Next, the operation of the embodiment of the invention will be described with reference to FIGS. 1 to 3D.

The control section 10 reads a V-chip signal from the video signal in the video processing circuit 5, and decodes the V-chip signal (step S1). Referring to the memory 11, the decoded code is checked whether it coincides with the code which has been set in the memory, thereby judging whether the screen is to be blocked or not (step S2). If the code of the read V-chip signal coincides with that which has been set in the memory, it is judged that the screen is to be blocked, and, if the code of the read V-chip signal does not coincide with that which has been set in the memory, it is judged that the screen is not to be blocked.

If it is judged that the screen is to be blocked (Yes in step S2), the screen is set to a blocked state so that the original image is not displayed on the CRT 7 (step S8). The screen can be set to a blocked state by, for example, changing the whole screen to a screen of a uniform color of blue or black, and displaying characters indicative of the blocking operation, in a part of the screen. If it is judged that the screen is not to be blocked (No in step S2), the above-mentioned blocking process is not performed.

Next, the result of the judgment in step S2 is recorded into the memory 11 (step S3). For example, this recording is conducted by, if the screen is to be blocked, setting flag "1", and, if the screen is not to be blocked, setting flag "0".

Then, it is judged whether the mode is transferred to a special play mode or not (step S4). As described above, a special play mode is a mode in which an operation such as a slow play, a pause, or a search is performed, and is set by operating a switch (not shown) of the video player 3. If the mode is not transferred to a special play mode (No in step S4), a next V-chip signal is read from the video signal and then decoded, and it is again judged whether the screen is to be blocked or not, in the same manner as described above (step S5). Thereafter, it is judged whether the judgment result is changed from that of the previous judgment or not (step S6).

If the judgment result is not changed (No in step S6), the process control returns to step S4 to monitor the transfer to a special play mode. If the judgment result is changed (Yes in step S6), it is then judged whether the play mode is ended or not (step S7). If the play mode is not ended (No in step S7), the process control returns to step S3 to record the changed judgment result into the memory 11, and steps S4 to S7 are then repeated. If the play mode is ended (Yes in step S7), the series of operations is ended. In the normal play mode, the apparatus operates as described above.

When the normal play mode is transferred to a special play mode at a time $T_1$ in FIGS. 3A to 3D, the judgment in step S4 is Yes, and the process control jumps to step S9. In step S9, the memory 11 is referred, and the judgment result which immediately precedes the transfer to the special play mode is read out. Namely, the judgment result at a time A in FIG. 3A is read out from the memory 11.

Next, on the basis of the immediately preceding judgment result which has been read out, it is judged whether the screen is to be blocked or not (step S10). If the immediately preceding judgment result is that the screen is to be blocked, this judgment result is applied as it is or it is judged that the screen is to be blocked (Yes in step S10), and the screen is blocked in the same manner as described above (step S12). If the immediately preceding judgment result is that the screen is not to be blocked, this judgment result is applied as it is or it is judged that the screen is not to be blocked (No in step S10), and the screen is not blocked.

Thereafter, it is judged whether the special play mode is cancelled or not (step S11). If the special play mode is not cancelled (No in step S11), the process control returns to step S10 to maintain the blocked state or the non-blocked state. When the special play mode is cancelled at a time $T_2$ in FIGS. 3A to 3D, the judgment of step S11 is Yes, and the process control returns to step S1 to perform the above-described operations of the normal play mode (S1 to S8).

In the embodiment, as described above, when the mode is transferred to a special play mode, the immediately preceding judgment result is referred, and the blocking process is performed in accordance with the judgment result. Even in the case where a V-chip signal in a zone of the special play mode is not correctly read, when the immediately preceding judgment result is that the blocking is to be reproduced, therefore, the screen can be surely blocked in the zone. Namely, it is possible to effectively prevent the blocking from being intentionally disabled by an operation of reproduction in a special play mode.

The invention is not restricted to the embodiment described above, and may employ various other modes. In the embodiment, a code of a V-chip signal which is used for the blocking is preset in the memory 11, and only a V-chip signal which corresponds to the preset code is used as an object of the blocking. Alternatively, with respect to all V-chip signals, the blocking may be unconditionally performed.

In the embodiment, the memory for recording the code of a V-chip signal, and that for recording a judgment result as to whether the blocking is to be performed or not are configured by the same single memory or the memory 11. Alternatively, these data may be recorded in different memories, respectively.

Although a TV/VCR combination has been described as an example in the embodiment, the invention may be applied to a set of a video player and a television receiver which are separately configured. As a display device, in place of a CRT, another device such as a liquid crystal display device may be used.

According to the presence or absence of the blocking immediately before the transfer to a special play mode is stored into a memory, and processing when the mode is transferred to the special play mode is performed in accordance with the contents stored in the memory. Even in a special play mode, therefore, the screen can be surely blocked, and it is possible to effectively prevent the blocking from being intentionally disabled.

What is claimed is:

1. A video reproduction apparatus, comprising:
   means for reading a V-chip signal added to a video signal for restricting a display of a specific image;
   means for judging whether a screen is to be blocked or not;
   a memory into which a result of the judgment is stored;
   means for reading a judgment result which immediately precedes the transfer to the mode from said memory when a mode is transferred to a special play mode; and
   means for performing a blocking process in accordance with the judgment result.

2. A video reproduction apparatus wherein said apparatus comprises:
   a video player which reproduces a video signal, a V-chip signal for restricting a display of a specific image being added to the video signal;
   a video processing circuit which processes the video signal from said video player; a display device which displays the video signal that is processed by said video processing circuit; and
   a control section which reads out the V-chip signal and judges whether a screen is to be blocked or not; and a memory which stores a result of the judgment;
   wherein when a mode is transferred to a special play mode, said control section reads out a judgment result which immediately precedes the transfer to the mode from said memory, and performs a blocking process in accordance with the judgment result.

3. A video reproduction apparatus according to claim 1, wherein a code of a V-chip signal to be used for blocking is preset in a memory, and, if a code of the read V-chip signal coincides with the code that is preset in said memory, it is judged that the screen is to be blocked, and, if the code of the read V-chip signal does not coincide with the code that is preset in said memory, it is judged that the screen is not to be blocked.

4. A video reproduction apparatus according to claim 2, wherein a code of a V-chip signal to be used for blocking is preset in a memory, and, if a code of the read V-chip signal coincides with the code that is preset in said memory, it is judged that the screen is to be blocked, and, if the code of the read V-chip signal does not coincide with the code that is preset in said memory, it is judged that the screen is not to be blocked.

5. A video reproduction apparatus according to claim 1, wherein the special play mode is a mode entered in response to a slow play, pause or search operation.

6. A video reproduction apparatus according to claim 2, wherein the special play mode is a mode entered in response to a slow play, pause or search operation is performed.

7. A method for determining whether to block a video signal
   comprising:
      decoding a V-chip signal;
      determining whether a screen is to be blocked;
      storing a result of the determination of whether the screen is to be blocked;
      determining whether a special play mode has been entered; and
      blocking the screen while in the special play mode when the stored result
   is that the screen is to be blocked.

8. A method according to claim 7, wherein the determination of whether a screen is to be blocked comprises:
   determining whether a code set in memory coincides with a code in decoded V-chip signal.

9. A method according to claim 7, wherein the special play mode is a mode entered in response to a slow play, pause or search operation.

* * * * *